United States Patent [19]
Scott

[11] 3,948,355
[45] Apr. 6, 1976

[54] VARIABLE RETRACTING DEVICE

[76] Inventor: Joseph J. Scott, 7812 Lexington, Philadelphia, Pa. 19152

[22] Filed: Jan. 31, 1975

[21] Appl. No.: 545,970

[52] U.S. Cl. .................... 185/39; 188/266; 267/156
[51] Int. Cl.² .......................................... F03G 1/00
[58] Field of Search ...... 185/39; 188/266, 297, 298; 267/156

[56] References Cited
UNITED STATES PATENTS

| | | | |
|---|---|---|---|
| 2,688,150 | 9/1954 | Roussel........................... | 188/298 X |
| 3,078,966 | 2/1963 | Thomas ............................ | 188/298 |
| 3,103,034 | 9/1963 | Fisher............................. | 267/156 X |
| 3,561,570 | 2/1971 | Sundermann.................... | 188/266 X |
| 3,581,774 | 6/1971 | Oeland, Jr. ..................... | 267/156 X |

*Primary Examiner*—Allan D. Herrmann
*Attorney, Agent, or Firm*—Jacob Trachtman

[57] ABSTRACT

A variable retracting device comprising a collapsible elongated tubular element providing a cavity therealong for receiving fluid therein and having first and second ends. A fluid reservoir means communicates with the cavity of the tubular element at its first end and has control means for regulating the flow of fluid between the cavity of the tubular element and the reservoir means. A restricting means engages and collapses the tubular element at locations between its first and second ends and is movable along the collapsed portion of the tubular element up to the uncollapsed portion containing fluid. An activating means urges the relative movement of the restricting means along and towards the first end of the tubular element creating a fluid pressure in the uncollapsed portion of the tubular element, whereby the relative movement of the restricting means along and towards the first end of the tubular element takes place with the collapse of the tubular element at the location of the restricting means and at a rate depending upon the flow of fluid from the cavity of the tubular element to the fluid reservoir means and regulated by the control means of the fluid reservoir means.

10 Claims, 7 Drawing Figures

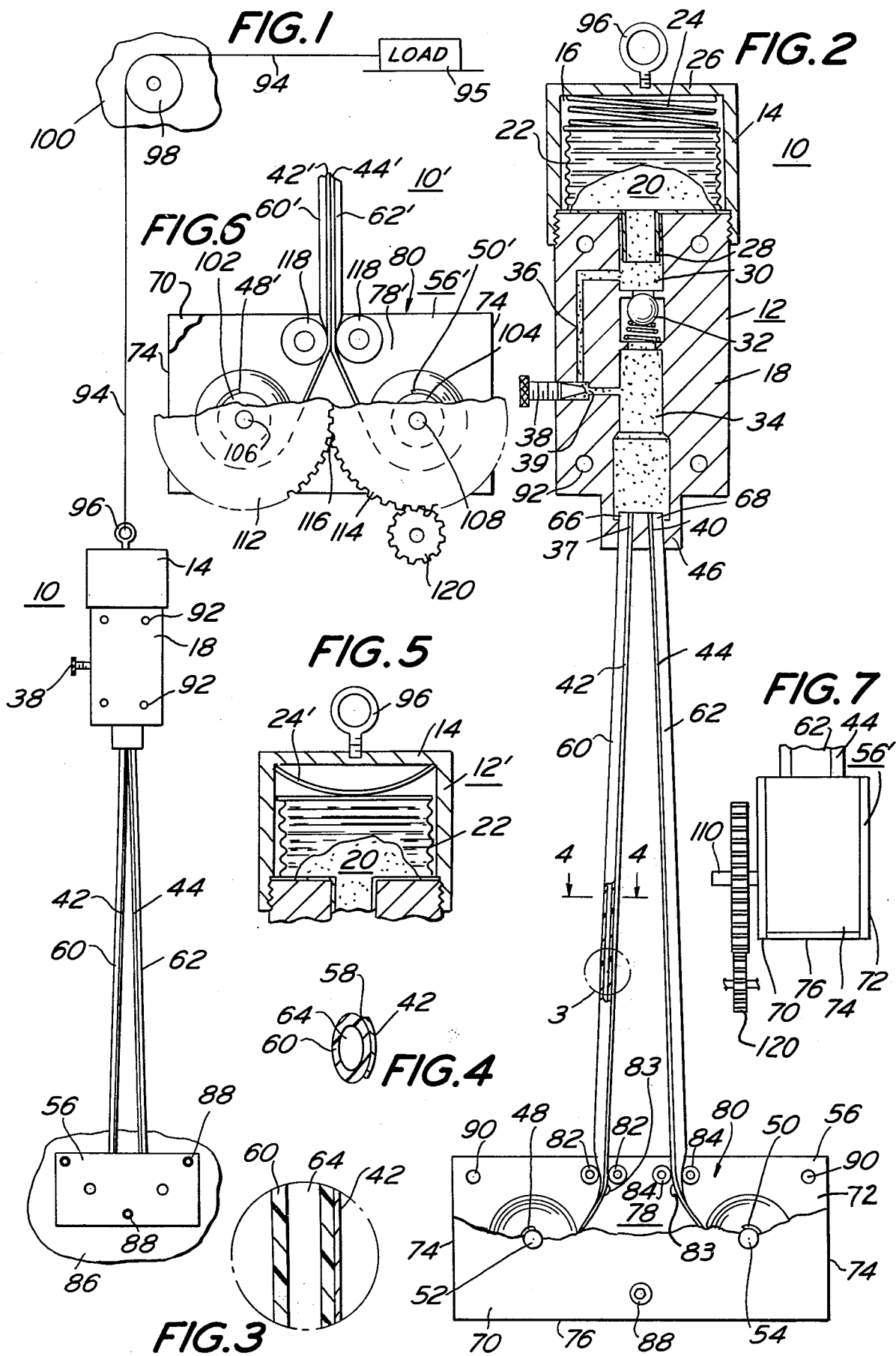

VARIABLE RETRACTING DEVICE

The invention relates to a variable retracting device of the type providing controlled linear or rotary motion, and more particularly to a variable retracting device utilizing the flow of hydraulic fluid for controlling and regulating the linear or rotary movement produced.

Heretofore variable force and constant force spring devices have been produced for providing variable or constant forces with movement of an object. Such devices, however, have not provided for controlling the rate of movement over various periods of time.

Therefore, it is a principal object of the invention to provide a new and improved variable retracting device which allows for controlled movement over a long or short duration of time.

Another object of the invention is to provide a new and improved variable retracting device utilizing hydraulic fluid means for controlling the rate and duration of movement of the spring device.

Another object of the invention is to provide a new and improved variable retracting device which provides controlled linear or rotary movement under actuation of spring force.

Another object of the invention is to provide a new and improved variable retracting means which may have the rate of its retraction varied by a control means.

Another object of the invention is to provide a new and improved variable retracting device which may be accurately adjusted for its retracting action, and is durable and reliable in operation.

Another object of the invention is to provide a new and improved variable retracting device which may be readily and inexpensively constructed and operated.

The above objects of the invention are achieved by providing a variable retracting device comprising a collapsible elongated tubular element having a cavity therealong for receiving fluid therein and having first and second ends. A fluid reservoir means which communicates with the cavity of the tubular element at its first end has a control means for regulating the flow of fluid between the cavity of the tubular element and the reservoir means. A restricting means engages and collapses the tubular element at locations between its first and second ends and is movable along the collapsed portion of the tubular element up to the uncollapsed portion containing fluid. Activating means urges movement of the restricting means relative to the tubular element along and towards the first end of the tubular element to create a fluid pressure in the uncollapsed portion of the tubular element. The relative movement of the restricting means along and towards the first end of the tubular element takes place with the collapse of the tubular element at the location of the restricting means and at a rate regulated by the control means of the fluid reservoir means. Thus, the rate at which fluid flows from the cavity of the tubular member to the fluid reservoir, controls and conditions the movement of the restricting means along the tubular element providing controlled linear motion by the variable retracting device.

The fluid reservoir means has a chamber which expands with the receipt of fluid, and means for maintaining under pressure, the fluid received therein. The control means of the fluid reservoir means comprises an adjustable needle valve for regulating the flow of fluid from the tubular element into the chamber of the reservoir means. The valve means which comprises a spring loaded ball check valve, provides unrestricted flow of fluid out of the chamber and into the cavity of the tubular element when the pressure of fluid in the tubular element communicating with the reservoir means is below the fluid pressure in the chamber of the reservoir means, which condition occurs during the resetting of the variable retracting device after a retracting operation.

The activating means preferably comprises a constant force spring having an elongated member prestressed for assuming a coiled condition. The first and second ends of the spring are respectively secured with the first and second ends of the tubular element and its intermediate portion is secured along said tubular element between its first and second ends. The second end of the spring, with its secured tubular element in collapsed condition, is receivable about the storage means of the housing which may comprise a bushing. The prestressing of the spring tends to cause the member to coil about the storage means of the housing contracting the spring and moving the first end of the member towards the housing. A pair of counter balancing constant force spring members may be utilized with a pair of spring storage means for providing balanced operation. The pair of spring storage means may alternatively comprise a pair of rotatable storage drums. Each drum has an axle fixed thereto and is retained for rotatable motion within the housing with its axle extending from the housing. A pair of gear wheels may be respectively secured for rotation with the axles of the drums and in interengagement with each other. The second ends of the pair of spring members are respectively secured to one of the storage drums, whereby the interengaged gear wheels provide coordinated rotation of the drums with the contraction of said pair of spring elements and convert such spring contractions to rotary output movement or torque.

The foregoing and other objects of the invention will become more apparent as the following detailed description of the invention is read in conjunction with the drawings, in which:

FIG. 1 is a front elevational view of a variable retracting device embodying the invention, FIG. 2 is an enlarged front elevational view with parts broken away and in section of the device shown in FIG. 1, FIG. 3 is an enlarged sectional view of the portion within the dashed lines indicated by the reference numeral 3 in FIG. 2, FIG. 4 is an enlarged sectional view taken on line 4—4 of FIG. 2, FIG. 5 is a sectional view of a modified form of the chamber and spring pressurizing means of the fluid reservoir means of the device shown in FIG. 2, FIG. 6 is a front elevational view of a modified form of spring storage means and housing for the device shown in FIG. 2, and FIG. 7 is a side elevational view of the spring storage means and housing shown in FIG. 6.

Like parts are designated by like numerals throughout the several views.

Refer to the FIGS. 1 to 4 which illustrate a variable retracting device 10 embodying the invention. The variable retracting device 10 includes a fluid reservoir means 12 comprising a cylindrical cap 14 providing a cavity 16 therein which threadedly engages and is secured with a body 18 containing fluid control means. A fluid receiving chamber 20 of the reservoir means 12 is provided by a bellows structure 22 which is positioned within the cavity 16 of the cap 14. A coil spring 24 is located between the top wall 26 and the bellows structure 22, for urging the bellows structure 22 towards its collapsed condition for maintaining pressure on the fluid within the chamber 20.

The bellows structure 22 is provided with a tubular neck portion 28 which provides an opening for receiving and dispensing fluid from the chamber 20. The tubular neck portion 28 extends into an opening 30 in the body 18 which extends to a check valve 32. The valve 32 comprises a ball and spring for normally maintaining the check valve 32 in its closed position. The check valve 32 connects the opening 30 to an opening 34 in the body 18 when the fluid pressure in the opening 30 exceeds by a predetermined value the fluid pressure in the opening 34, at which time unrestricted flow of fluid is allowed from the chamber 20 of the bellows structure 22 through the opening 30, check valve 32 to the opening 34. The pressure in the chamber 20 is maintained by the action of the coil spring 24 which reduces the volume of the chamber by compressing the bellows 22. When the pressure in the chamber 20 is less than the fluid pressure in the opening 34, the check valve 32 closes thus preventing flow of fluid in the opposite direction through the check valve into the chamber 20.

A fluid control passageway 36 having a U shaped configuration is provided between the openings 34 and 30, by-passing the check valve 32, and allowing flow of fluid from the opening 34 to the opening 30 when the pressure of fluid in the opening 34 exceeds the pressure of fluid in the opening 30 placing the check valve 32 in its closed position.

A needle valve provided by the screw 38, having a tapered end, is interposed in the passageway 36 for providing a restrictable orifice 39 and controlling the rate of flow of fluid from the opening 34 to the opening 30 and into the chamber 20 of the reservoir means 12.

The top ends 37 and 40 of a pair of elongated spring members 42 and 44 are secured with the bottom portion 46 of the body 18 of the reservoir means 12. The elongated spring members 42 and 44 may preferably be of the type disclosed in U.S. Pat. No. 2,647,743 dated Aug. 4, 1953. The spring members 42 and 44 thus may be of the type which are prestressed to assume a coiled configuration. Accordingly, as illustrated in FIG. 2, the second free ends 48 and 50 of the members 42 and 44 respectively tend to coil in opposite directions about the pair of bushings 52 and 54 secured within a spring storage housing 56.

Such spring members 42 and 44 are also commercially available as NEG'ATR extension springs from Ametek, Hunter Spring Division, Hatfield, Pa. As seen from FIG. 4, the spring members 42 and 44 have an arched cross section and are arranged with their concave surfaces 58 facing outwardly. Two elongated resilient tubular elements 60 and 62 which normally assume an oval shaped cross section as shown in FIG. 4, are respectively secured by gluing or other means to the outer concaved surfaces 58 of the members 42 and 44 and extend along the length of the members 42 and 44 as illustrated in FIG. 2. The tubular elements 60 and 62 are provided with a cavity therein which extends along its length. The tubular members 60, 62 are preferably made of a strong thin flexible material such as nylon or any other such suitable material. Although the bottom ends of the tubular elements 60, 62 are preferably sealed, the top ends 66 and 68 are open permitting the cavities 64 of the tube elements 60 and 62 to communicate with the opening 34 of the body 18 of the reservoir means 12. This allows hydraulic fluid from the chamber 20 to be received into the cavities 64 of the tube elements 60 and 62 when the tubes 60 and 62 are extended as shown in FIG. 4, while allowing fluid in the cavities 64 of the tube elements 60 and 62 to flow out of the tube elements and into the reservoir means 12 when the cavities 64 are collapsed displacing the hydraulic fluid therefrom.

The spring member housing 56 has front and back plates 70 and 72, side plates 74 and a bottom plate 76 providing a cavity 78 therein, and a top opening 80 for receipt therethrough of the spring members 42 and 44 and their tube elements 60 and 62 attached thereto.

A pair of rollers 82 are positioned within the cavity 78 of the housing 56 between the front and back walls 70 and 72 and close to the top of the housing 56. The spring member 42 and its tubular element 60 which pass through the opening 80 in the housing 56 extend between the rollers 82. The rollers 82 are spaced from each other to provide a restriction allowing the member 42 and its tube element 60 to pass downwardly therebetween only after the tubular element 60 at the rollers 82 is collapsed by the expulsion of fluid at that location. The member 42 and the collapsed tubular element 60 below the rollers 82 coil about the bushing 52 as shown in FIG. 2.

The spring member 44 which is connected in a back to back counter balancing relationship with the spring member 42 and similarly connected with the reservoir means 12 at its upper end, extends downwardly with its attached tubular element 62 through the restriction provided between a second pair of rollers 84 which are supported in spaced symmetrical relationship to the rollers 82 within its chamber 78 at the top of the housing 56. The spring member 44 and its tube element 62 also pass downwardly between the rollers 82 as the tube element collapses with the ejection of fluid in the tube element 62 under the downward force provided by the action of the member 44. The spring member 44 and collapsed tubing 62 which extend below the rollers 82 also assume a coiled configuration about the bushing 54 due to the prestressing of the spring member 44.

In operation, the variable retracting device 10 controls the movement of the reservoir means 12 towards the housing 56. Thus, if the housing 56 is to remain affixed with a supporting structure such as shown at 86 in FIG. 1, the housing 56 may be secured by bolts 88 which extend through openings 90 in the housing. However, if the reservoir is to be secured to a fixed structure then this may also be accomplished by similar bolt means extending through the openings 92 in its body 18.

FIG. 1, for the purpose of illustration, shows the reservoir means 12 positioned above the housing 56, with the housing secured to a supporting structure 86 and the reservoir means 12 movable with respect thereto. The spring members 42 and 44 with their tubular elements 60 and 62 are in an extended position, the stiffness of the pair of counter balancing spring elements 42 and 44 being sufficient to support the reservoir means 12 in position shown. However, other supporting means such as guide rails and tracks (not shown) may be utilized. A load 95 may be connected as shown in FIG. 1 by a cord 94 to the loop 96 at the top of the reservoir 12 passing over the idler wheel 98 secured to the supporting surface 100 for being actuated by the retracting device 10.

The retracting device 10 illustrated in FIGS. 1 and 2 has its tubular elements 60, 62 in their non collapsed condition as shown in FIG. 4 at locations extending above the rollers 82 and 84 toward their top ends 66 and 68. The elements are filled with hydraulic fluid from their top ends to the location of their respective rollers 82, 84. To initiate the controlled retracting action of the device 10, the needle valve 38 is opened to the extent required for regulating and controlling the downward movement of the reservoir means 12 towards the housing 56. Since the spring members 42 and 44 tend to assume their coiled conditions, a force is exerted upon the extending portions of the spring members 42 and 44, drawing them downwardly between the pairs of rollers 82 and 84 to their coiled conditions about the bushings 52 and 54 respectively. The unrestricted downward movement of the spring members 42 and 44 into the housing 56 is prevented, however, by the expanded condition of the tubular elements 60 and 62 above the restricting rollers 82 and 84. The force tending to move the members 42 and 44 downwardly, however, exerts a force at the rollers 82 and 84 upon the fluid in the cavities of the tubular elements 60 and 62 providing a fluid pressure. The resulting fluid pressure is greater than the fluid pressure provided by the spring 24 in the chamber 20 of the bellows 22. This causes the flow of fluid from the cavities of the tubular elements 60 and 62 into the opening 34 of the body 18. Since the check valve 32 is maintained in its closed position by such elevated pressure, the hydraulic fluid can only pass through the restricted passageway 36 into the chamber 20 of the bellows 22. The rate of passage of such fluid is controlled by the restriction at the orifice 39 which is adjusted by the needle valve 38. As the fluid is expelled from the cavities of the tubular elements 60 and 62, the spring members 42 and 44 are allowed to pass between the rollers 82 and 84 and assume their coiled conditions about their respective bushings 52 and 54. Thus, the controlling action of the needle valve 38 regulates the rate of movement of the reservoir means 12 towards the housing 56 and the retracting action of the device 10. With the use of constant force spring members 42 and 44, a constant retracting movement can be maintained over a period of time which may extend over many hours. A relatively faster constant movement may also be achieved by allowing a greater flow of fluid during the retracting action. Thus, with its slow constant motion, the device may be used for precisely moving or conditioning an instrument or other means as a function of time. It may also be used to accomplish many practical functions such as opening and closing drapes over extended or short time periods.

The retracting device 10 continues to move the reservoir means 12 in the downward direction until it closely approaches the housing 56 and the hydraulic fluid within the collapsed portions of the tube elements 60 and 62 has been expelled from the elements and receive into the reservoir means 12 at which time its action is terminated. In order to condition the variable retracting means 10 for a new timed retracting operation, the reservoir means 12 is moved away from the housing 56, causing the spring members 42 and 44 to uncoil from about the bushings 52 and 54 to their extended positions as shown in FIGS. 1 and 2. Due to the resiliency of the tube elements 60 and 62, they tend to assume their extended positions as shown in FIG. 4, when they move upwardly out of the housing 56. This results in a lowered pressure within the cavities 64 of the tube elements 60 and 62 which is transmitted to the fluid within the opening 34. Since the pressure below the check valve 32 is now lower than the pressure in the chamber 20 of the bellows 22, the check valve 32 assumes its open position and unrestricted flow of hydraulic fluid takes place from the chamber 20 through the check valve 32 and into the cavities 64 of the tube elements 60 and 62. This results in the rapid filling of the tube elements 60 and 62 with hydraulic fluid. At this time, the pressures above and below the check valve 32 are equalized and the check valve 32 assumes its closed position preventing the reverse flow of fluid therethrough. If the control valve 38 completely restricts and closes the passageway 36, the reservoir means 12 will maintain its position above the housing 56. However, when it is desired to provide a retraction operation by the device 10, the needle valve 38 is again adjusted to control the movement desired and allowing the passage of fluid from the tube elements 60 and 62 through the passageway 36 into the chamber 20 of the reservoir means 12 under actuation of the spring members 42 and 44.

The retracting device 10 may be provided with stop means for limiting its motion between its extended and retracted positions. Thus, the stops such as the protrusions 83, shown in FIG. 2, are secured respectively with the spring members 42 and 44 proximate to their bottom ends 48 and 50 limiting the extension of the device 10. In operation, the protrusions 83 move upwardly with the extension of the spring members 42 and 44 until they engage their rollers 82 and 84. The protrusions 83 are of sufficient thickness to prevent their passage between the pairs of rollers 82 and 84 thus, preventing further extension of the spring members 42 and 44 and terminating their movement. Of course, other limiting means may also be utilized.

The device shown in FIGS. 1 to 4 may be modified to utilize a single spring member 42 and tubular element 60 to achieve similar results to that provided by the use of the plurality of members 42 and 44. The spring member 42 may also be replaced by a structural band which is secured at its bottom by a weight, a motor or other such means for providing a downward force to provide the timed retracting action.

FIG. 5 discloses a fluid reservoir 12' which is a modified form of the reservoir 12 shown in FIG. 2. The coil spring 24 is replaced by a leaf spring 24' for exerting a force tending to contract the bellows 22 for maintaining a pressure on the fluid within its chamber 20. The spring 24' may also be of the constant force type whereby a constant pressure is maintained on the fluid even with the contraction or expansion of the bellows 22.

FIG. 6 illustrates a housing 56' of a variable retracting device 10' which is a modified form of the housing 56 of the device 10 shown in FIG. 2. The housing 56' has secured therein for rotation, a pair of rotatable drums 102 and 104, each having an axle 106, 108 respectively secured therewith. The axles 106 and 108 each have an end 110 which extends horizontally out through the front wall 70 of the housing 56'. A gear wheel 112, 114 is respectively secured with the extending end 110 of each of the axles 106 and 108. The gear wheels 116 and 114 each have teeth about their periphery which interengage in the region 116. This results in the coordinated rotation of the drums 102 and 104, so that when the former drum moves in the clockwise direction the latter moves in the counter clockwise direction and vice versa.

The housing 56' is also provided with only one pair of rollers 118 which are located within the cavity 78' midway between the side walls 74 of the housing 56' proximate to the top opening 80. The rollers 118 are spaced from each other to provide a restricted opening therebetween for receiving the spring members 42', 44' in a back to back contacting relationship with the tubular elements 60' and 62' positioned on the outside of the members for contacting a respective roller 118. The space between the rollers 118 is sufficiently reduced to require the collapse of the tubular elements 60' and 62' for allowing the passage of the members 42', 44' and their elements 60', 62' therethrough into the cavity 78' of the housing 56'. The lower ends 48', 50' of each of the members 42', 44' are respectively secured to its respective drum 102, 104. Thus, when the members 42', 44' are received into the housing with the retracting action of the device 10', the drums 102 and 104 are caused to rotate respectively in the clockwise and counter clockwise directions. An even coordinated movement of the drums 102, 104 takes place because of their interconnection through their respective gear wheels 112 and 114. In addition to the linear movement which is provided by the retracting spring device 10', as noted previously in connection with the device 10, a controlled rotary movement or torque force is also derived by providing a take-off gear wheel such as the gear wheel 120. The wheel 120 is provided with peripheral teeth which engages either or both of the gear wheels 112, 114 and provide rotary movement or torque force with the controlled retracting action of the device 10'.

Although several particular embodiments and forms of the invention have been disclosed, it will be obvious to those skilled in the art, that the invention may find wide application with appropriate modifications to meet the individual design circumstances, without substantially departing from the essence of the invention.

What is claimed is:

1. A variable retracting device comprising a collapsible elongated tubular element providing a cavity therealong for receiving fluid therein and having first and second ends, a fluid reservoir means communicating with the cavity of said tubular element at its first end and having control means for regulating the flow of fluid between the cavity of said tubular element and the reservoir means, a restricting means engaging and collapsing said tubular element at locations between its first and second ends, said restricting means being movable along the collapsed portion of said tubular element up to the uncollapsed portion containing fluid, and activating means for urging the relative movement of the restricting means along and toward the first end of the tubular element creating a fluid pressure in the uncollapsed portion of said tubular element, whereby the relative movement of the restricting means along and towards the first end of the tubular element takes place with the collapse of the tubular element at the location of the restricting means and at a rate depending upon the flow of fluid from the cavity of the tubular element to the fluid reservoir means regulated by the control means of said fluid reservoir means.

2. The retracting device of claim 1 in which said activating means comprises a spring having an elongated member secured with and along said tubular element.

3. The retracting device of claim 1 in which said restricting means comprises a structure providing a restricted opening receiving said tubular element therethrough at a collapsed location of said tubular element and allowing movement of said tubular element only along collapsed portions of said tubular element.

4. The retracting device of claim 1 in which said fluid reservoir means includes a fluid receiving chamber and a variable orifice for regulating the flow of fluid from the cavity of said tubular element into the chamber of said reservoir means.

5. The retracting device of claim 4 in which said fluid reservoir means has a chamber which expands with receipt of fluid and means for maintaining under pressure the fluid received therein, and said fluid reservoir means includes valve means for allowing unrestricted flow of fluid out of the chamber and into the cavity of said tubular means when the pressure of fluid in the tubular means communicating with said reservoir means is below the fluid pressure in the chamber of said reservoir means.

6. The retracting device of claim 5 in which the control means of said fluid reservoir means comprises an adjustable needle valve for regulating the flow of fluid from the tubular element into the chamber of the reservoir means, the valve means of said fluid reservoir means for allowing the unrestricted flow of fluid out of the chamber and into the cavity of said tubular element when the pressure of fluid in the tubular element communicating with said reservoir means is below the fluid pressure in the chamber of said reservoir means comprises a spring loaded ball check valve, and the expandable chamber of said fluid reservoir is provided by a collapsible bellows structure with spring means urging said structure toward its collapsed condition for maintaining the fluid in said chamber under pressure.

7. The retracting device of claim 2 including a spring housing having a spring storage means, and in which said spring is a constant force spring having an elongated member prestressed for assuming a coiled condition with first and second ends respectively secured with the first and second ends of said tubular element and its intermediate portion secured with said tubular element between its first and second ends, the second end of said spring with its secured tubular element in collapsed condition being receivable about the storage means of said housing, the prestressing of said spring tending to cause said member to coil about the storage means of said housing contracting said spring and moving the first end of said member toward said housing.

8. The retracting device of claim 7 in which said restricting means comprises a structure supported by said housing providing a restricted opening receiving said tubular element and spring member therethrough at a collapsed location of said tubular element and allowing movement of said element and member therethrough towards said storage means with the collapse of the tubular element passing therethrough.

9. The retracting device of claim 8 in which said housing includes a pair of spring storage means, and includes a counter balancing pair of constant force spring members and tubular elements secured therewith having their second ends received respectively about said pair of spring storage means after passing through said restricting means.

10. The retracting device of claim 9 in which said pair of spring storage means comprise a pair of rotatable storage drums each having an axle fixed thereto extending from said housing, a pair of gear wheels respectively secured for rotation with the axles of said drums and being in engagement with each other, the second ends of said pair of spring members each being secured to a respective one of said storage drums, whereby said interengaged gear wheels provide coordinated rotation of said drums with the contraction of said pair of spring elements and convert such spring contraction to rotary output movement or torque.

* * * * *